United States Patent
Gebheim

(10) Patent No.: US 10,220,661 B1
(45) Date of Patent: Mar. 5, 2019

(54) HITCH RECEIVER—MOUNT CENTERING WEDGE SYSTEM

(71) Applicant: Gerald Carl Gebheim, New London, WI (US)

(72) Inventor: Gerald Carl Gebheim, New London, WI (US)

( * ) Notice: Subject to any disclaimer, the term of this patent is extended or adjusted under 35 U.S.C. 154(b) by 0 days.

(21) Appl. No.: 15/950,273

(22) Filed: Apr. 11, 2018

(51) Int. Cl.
   *B60D 1/52* (2006.01)
   *B60D 1/36* (2006.01)
   *B60D 1/58* (2006.01)
   *B60D 1/30* (2006.01)
   *B60D 1/24* (2006.01)

(52) U.S. Cl.
   CPC .............. *B60D 1/363* (2013.01); *B60D 1/241* (2013.01); *B60D 1/30* (2013.01); *B60D 1/52* (2013.01); *B60D 1/58* (2013.01)

(58) Field of Classification Search
   CPC .......... B60D 1/363; B60D 1/241; B60D 1/30; B60D 1/52; B60D 1/58
   See application file for complete search history.

(56) References Cited

U.S. PATENT DOCUMENTS

| 3,837,679 | A |   | 9/1974 | Dickmann |            |
|-----------|---|---|--------|----------|------------|
| 4,050,714 | A | * | 9/1977 | Epp      | B60D 1/06  |
|           |   |   |        |          | 280/495    |
| 4,678,199 | A |   | 7/1987 | Dickmann |            |
| 4,811,967 | A |   | 3/1989 | Hensley  |            |
| 5,423,566 | A |   | 6/1995 | Warrington |          |
| 5,580,088 | A | * | 12/1996 | Griffith | B60D 1/40 |
|           |   |   |        |          | 280/478.1  |
| 5,593,172 | A | * | 1/1997 | Breslin  | B60D 1/155 |
|           |   |   |        |          | 280/491.5  |
| 5,988,667 | A | * | 11/1999 | Young    | B60D 1/155 |
|           |   |   |        |          | 280/506    |
| 6,186,531 | B1 |   | 2/2001 | Parent   |            |
| 6,382,656 | B1 |   | 5/2002 | Johnson, Jr. |        |
| 7,004,491 | B1 | * | 2/2006 | Allsop   | B60D 1/52  |
|           |   |   |        |          | 280/491.2  |

(Continued)

OTHER PUBLICATIONS

Boone Outdoor Wedge 'J' shaped wedge hooks to retainer pin with 'eye' bolt for tensioning, patent pending. Offered for sale online by many retailers, but patent related info is available. https://booneoutdoorhardware.com/product/boone-outdoor-wedge/.

(Continued)

*Primary Examiner* — Joseph M Rocca
*Assistant Examiner* — Marlon A Arce

(57) ABSTRACT

This invention discloses a simple system of components that can be retrofitted to all standard receiver type hitches. It implements the very common round collet wedging principle to the square receiver tube using wedge shaped components to fill the gap between the receiver tube and the draw bar. The wedging action can be applied thru various combinations of differing components shapes. This invention does not modify the existing receiver or ball mount. The system can be adjusted to accommodate for changes after initial installation and previous wear. The wedging action provides forces to center the draw bar inside the receiver tube as well as lock it in place, resisting up/down, left/right, fore/aft movements. There are two basic configurations based on the method of attachment to the existing receiver. The wedge positioning action is the same for both.

13 Claims, 3 Drawing Sheets

(56) References Cited

U.S. PATENT DOCUMENTS

| | | | |
|---|---|---|---|
| 7,467,804 B2* | 12/2008 | Ezra | B60D 1/52 |
| | | | 280/506 |
| 7,594,673 B1* | 9/2009 | Devlin | B60D 1/50 |
| | | | 280/304.3 |
| 8,262,121 B2 | 9/2012 | Beck | |
| 8,419,041 B2 | 4/2013 | Bessette | |
| 8,596,664 B2 | 12/2013 | Lahn | |
| 8,696,011 B2 | 4/2014 | Despres | |
| 8,833,791 B2 | 9/2014 | Prescott | |
| D728,434 S | 5/2015 | Borkholder | |
| 9,027,950 B2 | 5/2015 | Lahn | |
| 9,421,836 B1 | 8/2016 | Ford | |
| 9,738,124 B1* | 8/2017 | Verheul | B60D 1/06 |
| 9,981,513 B2* | 5/2018 | Belinky | B60D 1/241 |
| 2009/0014983 A1* | 1/2009 | McKendry | B60D 1/241 |
| | | | 280/506 |
| 2009/0115165 A1* | 5/2009 | Coy | B60D 1/06 |
| | | | 280/506 |
| 2009/0218789 A1 | 9/2009 | Beck | |
| 2012/0228852 A1 | 9/2012 | Bessette | |
| 2013/0032620 A1 | 2/2013 | Prescott | |
| 2014/0084568 A1 | 3/2014 | Lahn | |

OTHER PUBLICATIONS

Boss Truck WedgeLockTM special tube ball mount with mechanism is to pull ball mount welds welds against end receiver tube. Was offered on Amazon.com, no longer available?https://www.bosstruckaccessories.com/motorcyclecarrier.html.

Secure-A-Hitch available from RV Towing Solutions, New South Wales, online, for tubular draw bar, it pulls aganst locking pin to put pressure on draw bar. http://rvtowingsolutions.com.au/products/secure-a-hitch.

\* cited by examiner

HITCH RECEIVER—MOUNT CENTERING WEDGE SYSTEM

BACKGROUND

Receiver type hitch assemblies are widely used for numerous applications: towing trailers, cargo racks, bicycle racks, tents, hoists, and more. There are SAE established weight rating and classes: Class I, II, III, and IV. Some manufacturers even use a class V designation, but this is not an SAE standard. These classes vary in physical dimensions and material strengths. All of these hitch assemblies have three parts: 1, a receiver—a square tube with a reinforcing lip around the rearward opening to absorb the loads from the trailer—firmly attached to the tow vehicle; 2, a draw bar, (ball mount, rack mount, mount), that is square and may be of tubular or solid construction, that fits inside the receiver and carries the applied load; and 3, a hitch pin that passes thru holes in the receiver walls and a hole in the draw bar to secure the draw bar in place. The draw bar and hitch pin are easily inserted into and removed from the receiver to facilitate interchangeability. The resultant problem of all these hitches is that the draw bar and hitch pin are loose inside the receiver, allowing it to move up/down, left/right, and in/out as the load forces are applied to the draw bar. This action causes wear and tear on the hitch components, leading to some instability, possible failures, and noise. There have been numerous patents issued for inventions proposed to address the problems. Some use a screw and threaded attachment that, when tightened, bias the draw bar against the inside of the receiver. Some of the prior art patents require no modifications to the existing components, however many of the patents disclosed highly modified draw bars that wedge themselves into the receiver along a single axis. The intention of the instant invention is to address the problems cited without modification to existing components, thereby preserving the SAE ratings and allowing use of existing standardized components.

BRIEF SUMMARY OF INVENTION

The subject invention addresses the gap that exists between the inside of the receiver tube and the outside of the draw bar by forcibly inserting four equal wedge shaped members along the four sides of the draw bar to fill the gap, thereby centering the draw bar and preventing its movement. One embodiment of subject invention includes members similar to those disclosed in U.S. Pat. No. 5,988,667 'Anti-Rattle Device for Trailer Hitch'; except for the elastomeric deformable member '14' that does nothing to center the draw bar. The subject invention discloses various wedge, rigid collar, and tensioning configurations, that are not cited in previous art, that can be combined to achieve the centering action disclosed herein.

DETAILED DESCRIPTION

Figure 1:
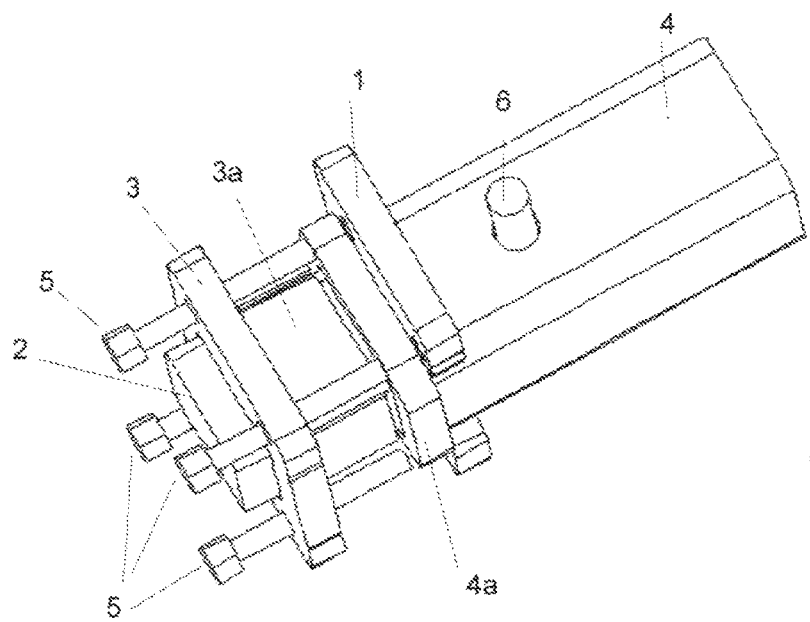
FIG. 1, (preferred) is exploded isometric bottom view of the invention installed on the hitch receiver with a rigid collar collet and 4 bolt tensioners.
Figure 2:
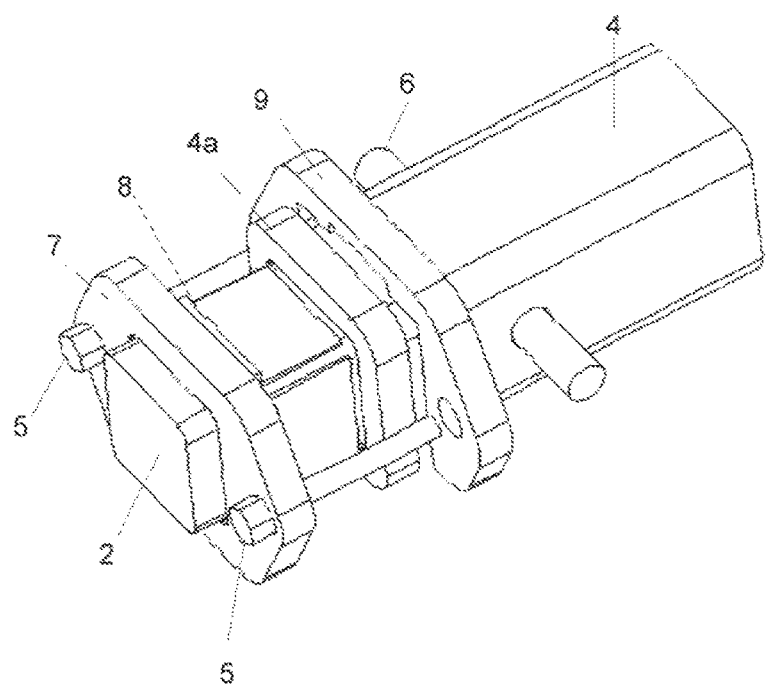
FIG. 2, is exploded isometric view of the invention installed on the hitch receiver with 4 individual wedges and 2 bolt tensioners.

The Hitch Receiver—Mount Centering Wedge System can be installed on all existing receiver/mount type hitches. It provides a method to center and tighten the ball mount shank inside the receiver tube, preventing movement and resultant wear due to the loose fit that is required for hitch functions of assemble and interchangeability. This mount centering wedge system does not require any modifications to the existing receiver or mounts. The invention discloses two different receiver attachment methods in combination with 3 different wedging configurations. All subject disclosures use the hitch pin to secure the mount as intended inside the receiver to meet the SAE standards. FIGS. 1 and 2 show two examples for attaching the subject invention to the existing receiver using the receiver reinforcing lip as the attachment point to retain the rigid receiver collars 1, or 9, to apply the forces needed to position and hold the wedged surfaces in place.

FIG. 1 (preferred) shows a one piece rigid collar collet 3 with integrated wedge surfaces 3a that fits/slides onto ball mount shank 2 oriented so the wedge portions 3a are directed toward the receiver 4 and fit into the gaps that exist between the receiver 4 and the ball mount shank 2. The rigid collar 1 is positioned from the top onto the outside of the receiver tube 4 behind the re-enforcing lip 4a. The 4 hex bolt fasteners 5 pass thru holes in the rigid collar collet 3 and are connected into threaded rigid collar 1 and apply pressure to the rigid collar collet 3 to drive the wedge portions 3a into the gaps, thereby centering and locking the ball mount shank 2 inside the receiver tube 4.

FIG. 2 shows a rigid collar 7 slid onto the ball mount shank 2. The 4 individual tapered wedges 8 fit/slide beside the ball mount shank 2, into the gap that exists between the receiver 4, and the ball mount shank 2. The threaded rigid collar 9 is placed behind the re-enforcing lip 4a onto the receiver tube from the top. The 2 hex bolt fasteners 5 pass thru holes in the rigid collar 7 and are connected to threaded rigid collar 9 and apply a force to the rigid collar 7 in turn driving the 4 individual tapered wedges 8 into the gaps, thereby centering and locking the ball mount shank 2 inside the receiver tube 4.

Figure 3:
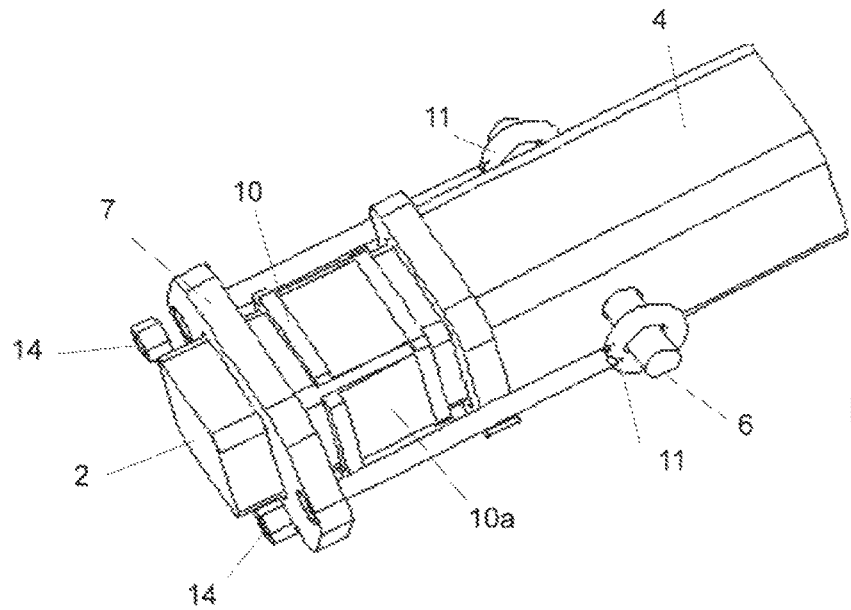
FIG. 3, is exploded isometric view of the invention installed on the hitch receiver with a wedge collet configuration and 2 eye bolt tensioners.
Figure 4:
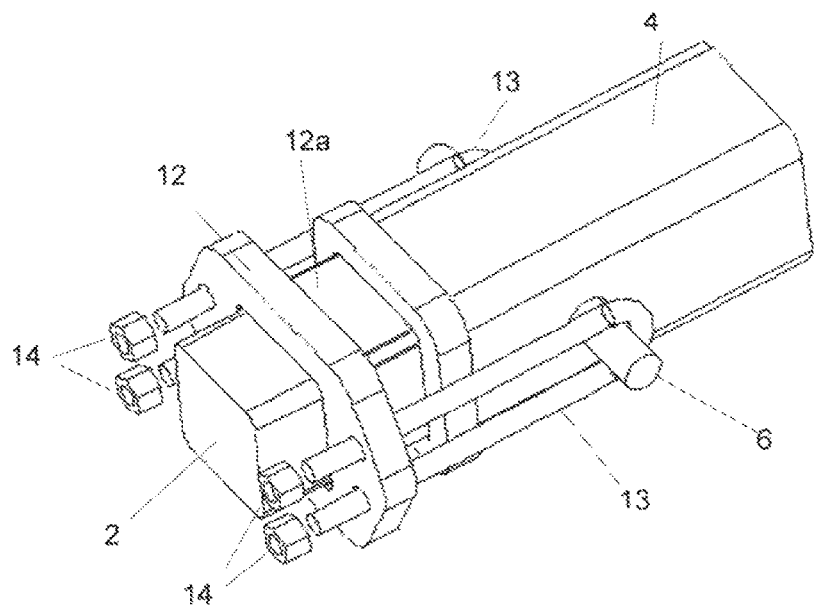
FIG. 4, is exploded isometric view of the invention installed on the hitch receiver with a rigid collar collet and 2 u-bolts tensioners.
Figure 5:
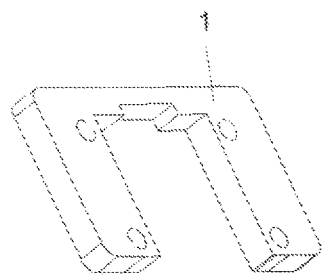
FIG. 5, is a prospective view of the preferred second rigid collar, with 4 threaded holes.
Figure 6:
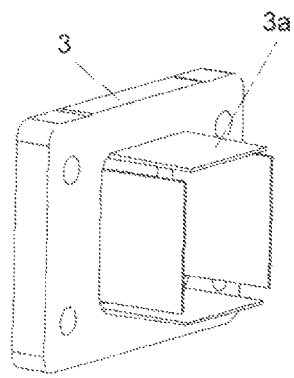
FIG. 6, is a prospective view of the preferred first rigid collar collet, with 4 holes.
Figure 7:
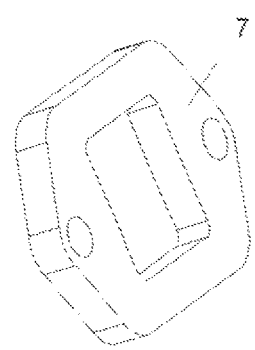
FIG. 7, is a prospective view of the first rigid collar with 2 holes.
Figure 8:
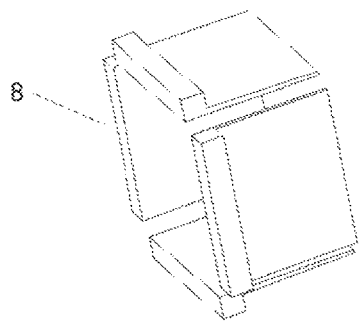
FIG. 8, is prospective view showing 4 loose wedge pieces.
Figure 9:
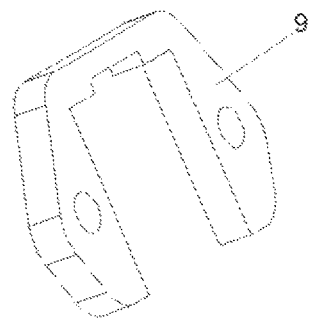
FIG. 9, is a prospective view of the second rigid collar with 2 holes.
Figure 10:
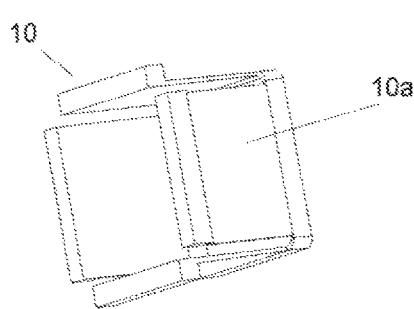
FIG. 10, is a prospective view showing a wedge collet configuration.
Figure 11:
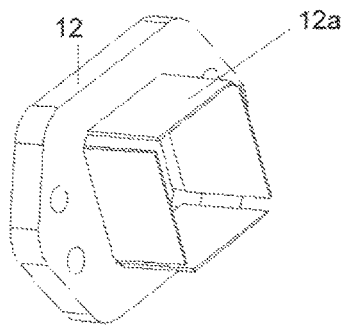
FIG. 11, is a prospective view of the second rigid collar collet with 4 holes for use with u bolts.

FIGS. 3 and 4, show two examples for attaching the subject invention to the existing receiver using the hitch pin 6 as the attachment point to apply the tensioning forces.

FIG. 3 (looks like U.S. Pat. No. 5,988,667 with its FIGS. 1 thru 5, but without the elastomeric deformable member 14. There is no centering described in this invention) shows a rigid collar 7 and a collet 10 of four tapered wedges 10a slid onto the ball mount shank 2 with the thin edges oriented toward the receiver 4 to fit inside the gap that exists between the receiver 4 and the ball mount shank 2. The 2 eye bolts 11 are connected to the receiver 4 via the hitch pin 6 and pass thru holes in rigid collar 9 to connect to 4 hex nuts 14 to apply a force to the rigid collar 9 and in turn against wedge collet 10 driving it into the gap, thereby centering and locking the ball mount shank 2 inside the receiver tube 4.

FIG. 4 shows a one piece rigid collar collet 12 slid onto the ball mount shank 2 oriented toward the receiver 4 such that wedge portions 12a fit inside the gaps that exists between the receiver 4 and the ball mount shank 2. The 2 u-bolts 13 connect to the receiver 4 via hitch pin 6 and pass thru holes in rigid collar collet 12 to connect to 2 hex nuts 14 to apply pressure to force the rigid collar collet 12 wedge surfaces 12a into the gaps, thereby centering and locking the ball mount shank 2 inside the receiver tube 4.

I claim:

1. A mount centering device for installation onto a hitch receiver and into a gap that exists between inside wall edges of a receiver tube and mount outside surfaces, comprising:
   a set of centering wedges disposed into the gap between said mount outside surfaces and said receiver tube inside wall edges;
   a tensioning means having anchoring means for anchoring to the receiver tube, and forcing said set of centering wedges into the gap between said mount outside surfaces and said receiver tube inside wall edges and thereby centering said mount and prohibiting movement.

2. The mount centering device of claim 1 wherein said set of centering wedges comprises a tapered surface on each wedge that when said mount is inserted into said receiver tube, the set of centering wedges can be slidably partially inserted into the gap along all sides of said mount.

3. The mount centering device of claim 1 wherein said tensioning means includes threaded bolts each provided with a means for anchoring the bolts to the receiver and applying pressure to said set of centering wedges.

4. The mount centering device of claim 1 wherein when said set of centering wedges, and the tensioning means are properly positioned and have been tightened, said set of centering wedge surfaces will be in tight contact with the mount outside surfaces and said receiver tube inside wall edges, thereby applying a clamping force to said mount causing said mount to be centered and held tightly in place.

5. A mount centering device for installation onto a hitch receiver and into a gap that exists between inside wall edges of a receiver tube and mount outside surfaces, comprising:
   a first rigid collar member with ear protrusions having opposite end apertures for a tensioning means, and a central aperture with a set of wedge shaped protrusions configured for movement along the mount;
   a second rigid collar member configured with ear protrusions therewith and apertures for tensioning means, configured for movement along the receiver tube;
   a tensioning means passing thru apertures in the first rigid collar member and having anchoring means at one end thereof for anchoring to said second rigid collar member for urging said first rigid collar member and the set of wedge shaped protrusions toward said receiver tube, and into the gap between said mount outside surfaces and said receiver tube inside wall edges and thereby centering said mount and prohibiting movement.

6. The mount centering device of claim 5 wherein said first rigid collar member has protrusions adjacent to each side of the central aperture comprising said set of wedge shaped protrusions each with a tapered outside surface, thereby becoming a collet, and when said mount is passed thru the central aperture and into said receiver tube said set of wedge shaped protrusions on said first rigid collar can be slidably partially inserted into the gap along all sides of said mount.

7. The mount centering device of claim 5 wherein said second rigid collar member comprises a 'U' shape created by an offset central aperture, thereby allowing placement onto the receiver tube, therethrough configured to correspond to the shape of the receiver tube for slidable movement therealong and retainment by a receiver tube reinforcing lip.

8. The mount centering device of claim 5 wherein said tensioning means includes bolts each provided with a means to anchor it to said first rigid collar member and with a threaded portion passing thru the apertures in the ear protrusions of said first rigid collar member for anchoring to said second rigid collar member.

9. The mount centering device of claim 7 wherein said second rigid collar member ear protrusions having threaded apertures there through for receiving the threaded portion of a tensioning bolt.

10. The mount centering device of claim 5 wherein when the first rigid collar with the set of wedge protrusions, the second rigid collar, and the tensioning means are properly positioned, and the tensioning means has been tightened, said second rigid collar will be in tight contact with a receiver tube reinforcing lip, and said first rigid collar set of wedge protrusions will be in tight contact with said mount outside surfaces and said receiver tube inside wall edges, thereby applying a clamping force to said mount causing said mount to be centered and held tightly in place.

11. A mount centering device for installation onto a hitch receiver and into a gap that exists between inside wall edges of a receiver tube and mount outside surfaces, comprising:
    a square wedge collet configured for movement along said mount;
    a tensioning means having anchoring means at one end thereof for anchoring to said receiver and the other end of the tensioning means for urging the square wedge collet into the gap between said mount outside surfaces and said receiver tube inside wall edges and thereby centering said mount and prohibiting movement.

12. The mount centering device of claim 11 wherein said square wedge collet comprises 4 portions connected, each with a tapered outside surface that when said mount is inserted thru the square wedge collet and into the receiver tube, the square wedge collet can be slidably partially inserted into the gap along all sides of said mount.

13. The mount centering device of claim 11 wherein when the square wedge collet, and the tensioning means are properly positioned and the tensioning means has been tightened, said square wedge collet will be forced into tight contact with said mount outside surfaces and said receiver tube inside wall edges, thereby applying a clamping force to said mount causing said mount to be centered and held tightly in place.

* * * * *